United States Patent
Yao et al.

(10) Patent No.: US 9,986,181 B2
(45) Date of Patent: May 29, 2018

(54) DIGITAL PIXEL EXPOSURE METHOD BY USING MULTIPLE RAMP VOLTAGE AS REFERENCE VOLTAGE

(71) Applicant: Tianjin University, Tianjin (CN)

(72) Inventors: Suying Yao, Tianjin (CN); Zhiyuan Gao, Tianjin (CN); Jiangtao Xu, Tianjin (CN); Zaifeng Shi, Tianjin (CN); Jing Gao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days. days.

(21) Appl. No.: 14/916,562

(22) PCT Filed: Dec. 12, 2014

(86) PCT No.: PCT/CN2014/093762
§ 371 (c)(1),
(2) Date: Mar. 3, 2016

(87) PCT Pub. No.: WO2015/158147
PCT Pub. Date: Oct. 22, 2015

(65) Prior Publication Data
US 2017/0126992 A1    May 4, 2017

(30) Foreign Application Priority Data
Apr. 14, 2014 (CN) .......................... 2014 1 0148438

(51) Int. Cl.
*H04N 5/353* (2011.01)
*H04N 5/363* (2011.01)
(52) U.S. Cl.
CPC .............. *H04N 5/353* (2013.01); *H04N 5/363* (2013.01)

(58) Field of Classification Search
CPC ................................ H04N 5/353; H04N 5/363
(Continued)

(56) References Cited

U.S. PATENT DOCUMENTS

| 2014/0362263 A1* | 12/2014 | Boisvert | H04N 5/378 348/294 |
| 2016/0028974 A1* | 1/2016 | Guidash | H04N 5/37455 348/294 |
| 2016/0255296 A1* | 9/2016 | Iwabuchi | H04N 5/2253 348/300 |

* cited by examiner

*Primary Examiner* — Tuan Ho
(74) *Attorney, Agent, or Firm* — Bei & Ocean; George G. Wang

(57) ABSTRACT

The present invention relates to a CMOS image sensor. The present invention provides a digital pixel sensor capable of maintaining consistency between two reference voltage changing rates. To this end, the invention proposes a technical solution in which a digital pixel exposure method by using multiple ramp voltage as reference voltage is provided. Said method includes the following steps: by means of PWM pixel array, a PWM pixel is composed of a photodiode PD, a reset transistor MRST, a pixel or column level comparator, and a pixel or column or array level memory; the two input ends of the pixel level comparator are connected with PD node voltage and a predefined reference voltage $V_{ref}$; after being reset, the PWM type digital pixel undergoes an exposure period; the exposure time includes a reset sampling period $T_{rs}$ and an integration sampling period $T_{is}$; in resetting sampling period, reference voltage $V_{ref}$ linearly rises from $V_{ref\_rsl}$ to $V_{ref\_rsh}$; The integration sampling period is divided into several sub periods. The present invention mainly applies to design and manufacture of CMOS image sensors.

2 Claims, 4 Drawing Sheets

(58) Field of Classification Search
USPC .................................................. 250/208.1
See application file for complete search history.

DIGITAL PIXEL EXPOSURE METHOD BY USING MULTIPLE RAMP VOLTAGE AS REFERENCE VOLTAGE

CROSS-REFERENCE TO RELATED APPLICATIONS

This application claims priority from PCT Application No. PCT/CN2014/093762, filed Dec. 12, 2014 and CN Application No. CN201410148438.4, filed Apr. 14, 2014, the contents of which are incorporated herein in the entirety by reference.

TECHNICAL FIELD

The present invention relates to the technical field of CMOS image sensor and more particularly, relates to a digital pixel exposure method by using multiple ramp voltage as reference voltage.

BACKGROUND OF THE INVENTION

Digital pixel sensor (DPS) is one kind of CMOS (Complementary Metal Oxide Semiconductor) image sensors. For this kind of sensor, conversion from analog to digital signal is performed in pixels, and the subsequent data readout and processing are both handled in digital domain. PWM (Pulse Width Modulation) is one kind of DPS. With reference to FIG. 1, pixel structure and operation based on PWM are described below. A typical PWM pixel is composed of a photodiode PD, a resetting transistor MRST, a pixel or column level comparator, and a pixel or column or array level memory (FIG. 1 shows a comparator and a memory both of which are of pixel level). The two input ends of the pixel level comparator are connected with PD node voltage and a predefined reference voltage $V_{ref}$. Input data of the pixel level memory is provided by a global counter arranged outside of a pixel array. The photodiode PD is reset to the reset voltage $V_{rst}$ in advance. During pixel integration, the photodiode capacitor is discharged by photocurrent generated by light, thus resulting in drop of the node voltage. The pixel level comparator compares the PD node voltage with the Vref, and if it is decreased to $V_{ref}$, the output of the comparator $V_{out}$ transits from high level to low level. This transition signal controls the memory of pixel level to stop "writing" operation and the value of the global counter is stored in the memory. At this time, data stored in the memory is just quantitative value of integration time of the pixel $t_{int}$, and this value is equivalent to the pulse width of the pixel generated in a time gap from beginning of integration to output toggle of the comparator. This value may be expressed as:

$$t_{int} = \frac{(V_{rst} - V_{ref}) \cdot C_{PD}}{I_{ph}} \qquad (1)$$

where, $I_{ph}$ is photocurrent, and $C_{PD}$ is the capacitance of the photodiode PD. Refer to FIG. 2, value of $t_{int}$ may represent photocurrent value of the pixel and $t_{int}$ is inversely proportional to $I_{ph}$. As the example in FIG. 2 shows, photocurrent of the photodiode PD under two kinds of light intensity is $I_{ph1}$ and $I_{ph2}$ respectively. According to formula (1), corresponding pulse widths are t1 and t2, and then:

$$\frac{t_1}{t_2} = \frac{I_{ph2}}{I_{ph1}} \qquad (2)$$

Assume the maximum and minimum signals which can be detected by the PWM pixel are $I_{ph\_max}$ and $I_{ph\_min}$ respectively. Then, the DR (Dynamic Range) may be expressed as:

$$DR = 20 \times \log\left(\frac{I_{ph\_max}}{I_{ph\_min}}\right) = 20 \times \log\left(\frac{t_{max}}{t_{min}}\right) \qquad (3)$$

From the above operation of PWM pixel, it can be understood that: under weak light condition, when the light intensity is below a constant threshold value, photocurrent of the photodiode is so weak (lower than $I_{ph\_min}$), that the node capacitor discharges slowly. Within predefined integration time, the node voltage will not be reduced to $V_{ref}$, and therefore, no transition signal is generated to perform "write" operation. In other words, detection ability of this structure is restricted by $V_{ref}$. Under high light intensity, the photodiode has large photocurrent (larger than $I_{ph\_max}$) and the PD voltage rapidly drops to $V_{ref}$. The counter has no time to generate valid value to be stored into the memory and therefore, information regarding high light intensity is lost. In a summary, under low and high light intensity environment, a typical PWM pixel structure requires higher and lower $V_{ref}$ respectively for shortening or extending $t_{sig}$ for the subsequent processing. Therefore, in this kind of PWM pixel, constant $V_{ref}$ is often not suitable for natural light environment, due to the limited DR. As a result, to obtain a larger dynamic range, some prior art adopts reference voltage which changes with time, and eliminates reset noise and offsets among pixels by multiple sampling. The principle is as follows:

During the exposure, the comparison of reference voltage includes two major periods. The first period is reset sampling period and the second period is integration sampling period. As shown in FIG. 3, exposure time includes a reset sampling period $T_{rs}$ and an integration sampling period $T_{is}$. In reset sampling period, $V_{ref}$ linearly rises from $V_{ref\_rsl}$ to $V_{ref\_rsh}$, while in integration sampling period, $V_{ref}$ rises from $V_{ref\_isl}$ to $V_{ref\_ish}$. In reset sampling and integration sampling periods, the PD voltage match Vref two times at $t_{PD\_rs}$ and $t_{PD\_is}$ respectively. Therefore, the difference between two time values $t_{PD}$ represents the light intensity, and the differencing operation eliminates reset noise and offset among pixels. This must be done under condition that the ramp changing rate of the reference voltage during reset sampling and integration sampling periods must be exact the same. Otherwise, $t_{PD\_rs}$ and $t_{PD\_is}$ will not completely eliminate reset noise and offsets, and extra offsets may be introduced. However, the integration sampling period time $T_{is}$ is generally much longer than reset sampling period time $T_{rs}$, and $T_{is}$ is normally 100-500 times as large as $T_{rs}$. Consequently, it is hard to keep consistent between reference voltage ramp changing rates of the two periods.

SUMMARY OF THE INVENTION

To overcome drawbacks of prior art and regarding problem of inconsistency of two changing rates between two reference voltages, the present invention provides a digital pixel sensor capable of maintaining consistency between two reference voltage changing rates. To this end, the invention proposes a technical solution in which a digital pixel exposure method by using multiple ramp voltage as reference voltage is provided. Said method includes the following steps: by means of PWM pixel array, a PWM pixel is composed of a photodiode PD, a reset transistor MRST, a pixel or column level comparator, and a pixel or column or array level memory; The two input ends of the pixel level comparator are connected with PD node voltage and a predefined reference voltage $V_{ref}$; after the first reset, the PWM digital pixel undergoes an exposure period; the exposure time includes a reset sampling period $T_{rs}$ and an integration sampling period $T_{is}$; in reset sampling period, reference voltage $V_{ref}$ linearly rises from $V_{ref\_rsl}$ to $V_{ref\_rsh}$; the integration sampling period is further divided into N sub periods, wherein N is an integer equals to or larger than 2; except for the last sub period, each of the rest sub period includes a reference voltage rising period and a reference voltage holding period; during each reference voltage rising period, the reference voltage rises from the minimum voltage $V_{ref\_isl\_in}$ to the maximum voltage $V_{ref\_ish\_n}$ of the same period, wherein n is an integer no less than 1 but no more than N; during each reference voltage holding period of the sub period, the reference voltage is changed to a constant value of $V_{ref\_hold}$ and it is maintained until the end of the period; when the next sub period comes, the reference voltage begins to rise again from $V_{ref\_isl\_n}$; after N-1 sub periods, the pixel enters the last sub period, the voltage rises from $V_{ref\_isl\_N}$ to $V_{ref\_ish\_N}$. This ends an exposure period, and pixel undergoes readout and reset period.

The number N of the sub periods depends upon time of integration sampling period, and may be selected and generated by a digital circuit of the PWM pixel array chip. The number N is determined when the PWM pixel array chip is designed and finally is cured into the PWM pixel array chip.

The present invention has the following technical features and good effects.

On the basis of comparing the reference voltages in two periods, more ramps are formed from the second period (the integration sampling period) to adjust consistency between changing rates of the reference voltages of the two periods. This guarantees that time difference obtained by twice comparison can truly eliminate reset noise and offset among pixels.

DETAILED DESCRIPTION OF THE INVENTION

In the present invention, a second period (that is integration sampling period) of a two-period comparison of a reference voltage solution is divided into N sub periods. The number N of the sub periods depends upon time of integration sampling period. If the time of integration sampling is long, then the value N may be a large value for example 10 or larger value. If integration sampling takes short time, then N may be in a range of 1-10. Selection of the sub period is generated by digital circuits of the chip and is determined when the chip is designed and finally cured into the chip. During these N sub periods, the reference voltage linearly rises from the minimum voltage $V_{ref\_isl\_n}$ to the maximum voltage $V_{ref\_ish\_n}$ of the same period, and then it transits to $V_{ref\_hold}$ and this voltage is maintained until the next sub period comes. Therefore, the sub period includes a reference voltage rising period and holding period. The reference voltage thus divided may ensure that in each sub period, the ramp rising rate of the reference voltage is consistent with the ramp changing rate of the reset sampling period. As such, this guarantees that time difference obtained by twice comparison can truly eliminate reset noise and offsets among pixels.

The detailed description is provided below.

Figure 1:
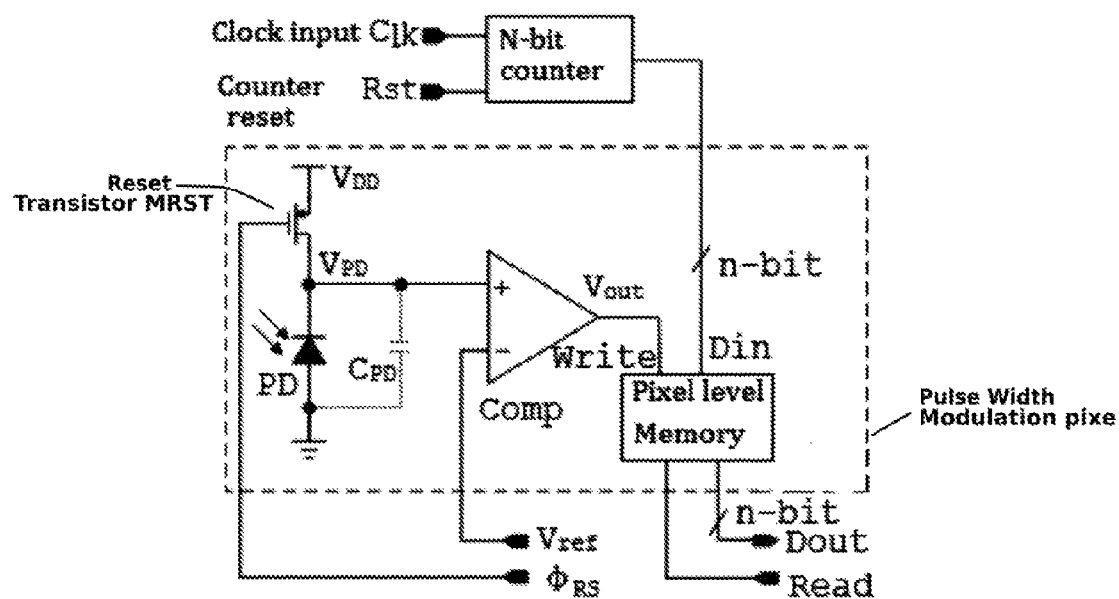
FIG. 1 shows a PWM-based digital pixel structure.
Figure 2:
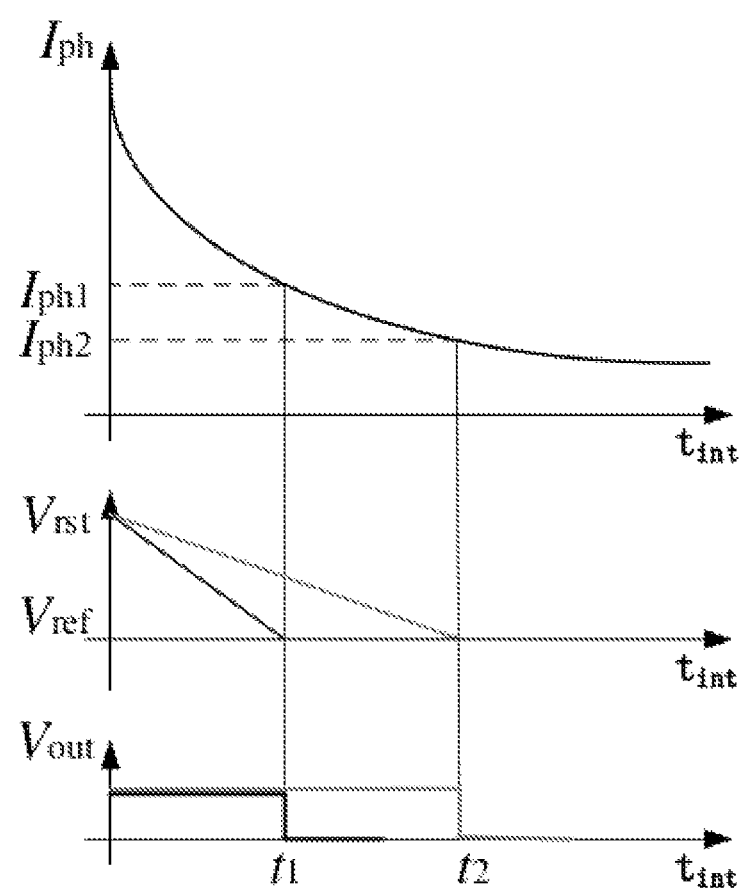
FIG. 2 shows relationship curve of pulse width $t_{int}$ and photocurrent $I_{ph}$.
Figure 3:
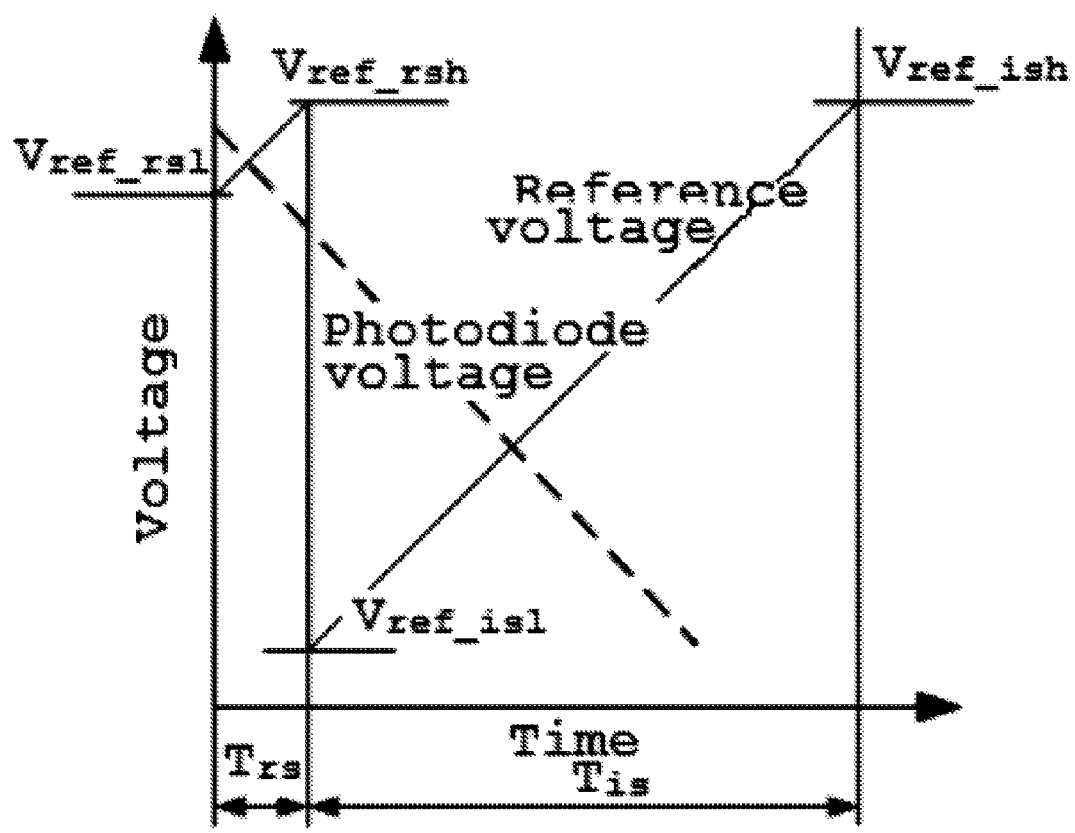
FIG. 3 is a schematic view indicating changes of two-period comparison between digital pixel reference voltage (denoted with solid line) and voltage of the photodiode (denoted with dashed line)

The present invention adopts a pixel structure as a normal PWM pixel as shown in FIG. 1 except for some changes in reference voltage and timing sequence.

After being reset, the PWM digital pixel undergoes an exposure period. The exposure time includes a reset sampling period $T_{rs}$ and an integration sampling period $T_{is}$. In reset sampling period, reference voltage $V_{ref}$ linearly rises from $V_{ref\_rsl}$ to $V_{ref\_rsh}$. The integration sampling period is further divided into N sub periods, wherein N is an integer equals to or larger than 2. Except for the last sub period, each of the rest sub periods includes a reference voltage rising period and a reference voltage holding period. During each reference voltage rising period, the reference voltage rises from the minimum voltage $V_{ref\_isl\_n}$ (wherein n is an integer no less than 1 but no more than N) to the maximum voltage $V_{ref\_ish\_n}$ of the same period. During each reference voltage holding period of the sub period, the reference voltage is changed to a constant value of $V_{ref\_hold}$ and this is maintained until the end of the period. When a next sub period comes, the reference voltage begins to rise again from $V_{ref\_isl\_n}$; after N-1 sub periods, during the last sub period, the voltage rises from $V_{ref\_isl\_N}$ to $V_{ref\_ish\_N}$. This ends an exposure period, and pixel undergoes readout and reset period.

Figure 4:
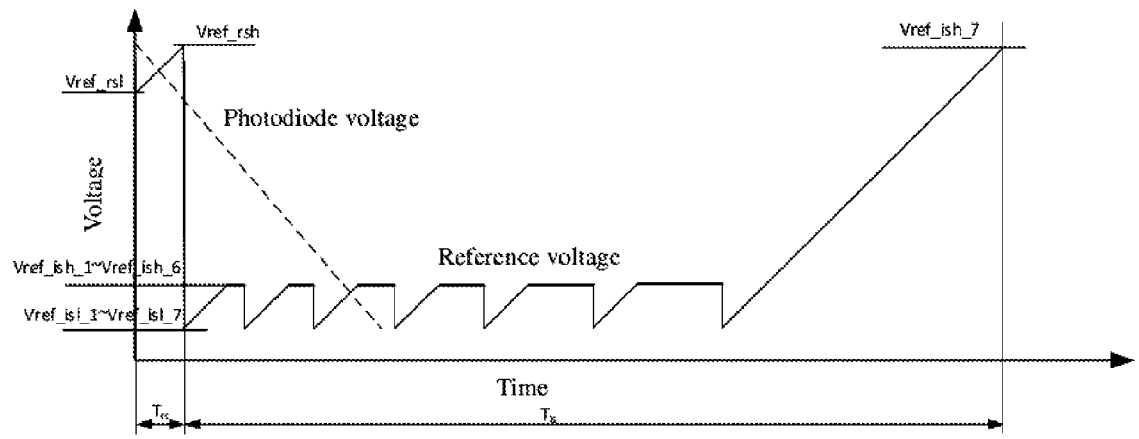
FIG. 4 is a schematic view indicating changes of the multiple ramp reference voltage between digital pixel reference voltage (denoted with solid line) and voltage of the photodiode (denoted with dashed line).

One embodiment of the invention is given by the manufacture process under 1.2V, 65nm. The frame rate of the designed image sensor is 60 frame/s, namely, each frame time is 16.66ms. FIG. 4 shows a schematic view of changes of the exposure time between the reference voltage and photodiode voltage. Wherein, $T_{rs}$ is preset to be 102.4 us, and $T_{is}$ is 16153.6 us. In reset sampling period, the reference voltage rises to $V_{ref\_rsh}$=1.2V from $V_{ref\_rsl}$=1.076V. The integration sampling period is divided into 7 sub periods which have a time of 636.8 us, 992 us, 1544 us, 2403.2 us, 3737.6 us, 5816 us and 1024 us respectively. The reference voltage rising duration time of the previous 6 sub periods is 368 us, and the voltage rises to 0.568V from 0.2V at all 6 rising periods. Among the previous six sub periods, except for the reference voltage rising duration of 368 us, the rest time is reference voltage holding period. The 7$^{th}$ sub period of 1024 us is totally reference voltage rising period, and the reference voltage rises to 1.2V from 0.2V.

What is claimed is:

1. A digital pixel exposure method by using multiple ramp voltage as reference voltage, comprising the following steps: by means of Pulse Width Modulation pixel array, a Pulse Width Modulation pixel is composed of a photodiode PD, a reset transistor, a pixel or column level comparator, and a pixel or column or array level memory; The two input ends of the pixel level comparator are connected with PD node voltage and a predefined reference voltage $V_{ref}$; after the first reset, the PWM digital pixel undergoes an exposure period; the exposure time includes a reset sampling period $T_{rs}$ and an integration sampling period $T_{is}$; in reset sampling period, reference voltage $V_{ref}$ linearly rises from $V_{ref\_rsl}$ to $V_{ref\_rsh}$; the integration sampling period is further divided into N sub periods, wherein N is an integer equals to or larger than 2; except for the last sub period, each of the rest sub period includes a reference voltage rising period and a reference voltage holding period; during each reference voltage rising period, the reference voltage rises from the minimum voltage $V_{ref\_isl\_n}$ to the maximum voltage $V_{ref\_ish\_n}$ of the same period, wherein n is an integer no less than 1 but no more than N; during each reference voltage holding period of the sub period, the reference voltage is changed to a constant value of $V_{ref\_hold}$ and this is maintained until the end of the period; when a next sub period comes, the reference voltage begins to rise again from $V_{ref\_isl\_n}$; after N-1 sub periods, during the last sub period, the voltage rises from $V_{ref\_isl\_N}$ to $V_{ref\_ish\_N}$; this ends an exposure period, and pixel undergoes readout and resetting period.

2. The digital pixel exposure method by using multiple ramp voltage as reference voltage according to claim 1, wherein the number N of the sub periods depends upon time of integration sampling period and is selected and generated by a digital circuit of the Pulse Width Modulation pixel array chip; and the number N is determined when the Pulse Width Modulation pixel array chip is designed and finally is cured into the Pulse Width Modulation pixel array chip.

* * * * *